United States Patent [19]
Strong et al.

[11] Patent Number: 5,461,847
[45] Date of Patent: Oct. 31, 1995

[54] LAWN MOWER HAVING IMPROVED HANDLE-TO-DECK COUPLING ARRANGEMENT

[75] Inventors: David S. Strong, Battersea; Richard P. Rosa, Brockville; Brian S. Burnett, Mallorytown, all of Canada

[73] Assignee: Black & Decker Inc., Newark, Del.

[21] Appl. No.: 289,453

[22] Filed: Aug. 12, 1994

[51] Int. Cl.[6] ............................................. A01D 34/82
[52] U.S. Cl. .......................... 56/16.7; 56/320.1; 16/111 A
[58] Field of Search .................................. 56/16.7, 17.5, 56/320.1, 320.2, DIG. 18; 16/111 A

[56] References Cited

U.S. PATENT DOCUMENTS

| | | | |
|---|---|---|---|
| 1,806,480 | 5/1931 | Manko | 56/DIG. 18 X |
| 2,046,585 | 7/1936 | Shattuck | 403/168 |
| 2,688,834 | 9/1954 | Kaeser . | |
| 3,481,123 | 12/1969 | Lessig, III . | |
| 3,796,353 | 3/1974 | Smrt | 56/320.1 X |
| 3,854,834 | 12/1974 | Lane . | |
| 4,108,456 | 8/1978 | Woelffer et al. | 16/111 A X |
| 4,211,058 | 7/1980 | Larsen | 56/17.5 |
| 4,341,060 | 7/1982 | Lowry et al. | 56/320.1 X |
| 4,574,568 | 3/1986 | Trelford | 56/202 |
| 4,711,077 | 12/1987 | Kutsukake et al. | 56/320.2 |
| 4,738,084 | 4/1988 | Ogano et al. | 56/320.2 X |
| 5,163,275 | 11/1992 | Hare et al. | 56/16.7 |
| 5,261,215 | 11/1993 | Hartz et al. | 58/DIG. 18 X |

FOREIGN PATENT DOCUMENTS

0478020A2  1/1992  European Pat. Off. .

Primary Examiner—George A. Suchfield
Attorney, Agent, or Firm—Harness, Dickey & Pierce

[57] ABSTRACT

An improved handle-to-deck coupling arrangement for a lawn mower. The coupling arrangement is provided in part by a lawn mower handle having a pair of curved distal end portions. The distal ends portions fit within a pair of channels integrally formed in a deck of the lawn mower. The end-most portions of each distal portion of the handle fit within sockets formed in a lower-most portion of the deck. This coupling arrangement serves to spread out stresses experienced by the deck over a larger area of the deck when pushing or lifting forces are exerted on the handle member by an operator. In a preferred embodiment, an anchor-type fastening assembly is included. The anchor-type fastening assembly is associated with at least one of the sockets and provides a plurality of arm portions which fit within an interior area of the end-most portion of the handle member once the end-most portion is inserted in the socket. The arm portions may then be expanded radially outwardly into contact with an inner surface wall of the end-most portion of the handle member by advancing a threaded fastener into the area defined by the socket. When completely advanced, the threaded fastener urges the arm portions radially outwardly, thus locking the end-most portion in the socket.

13 Claims, 2 Drawing Sheets

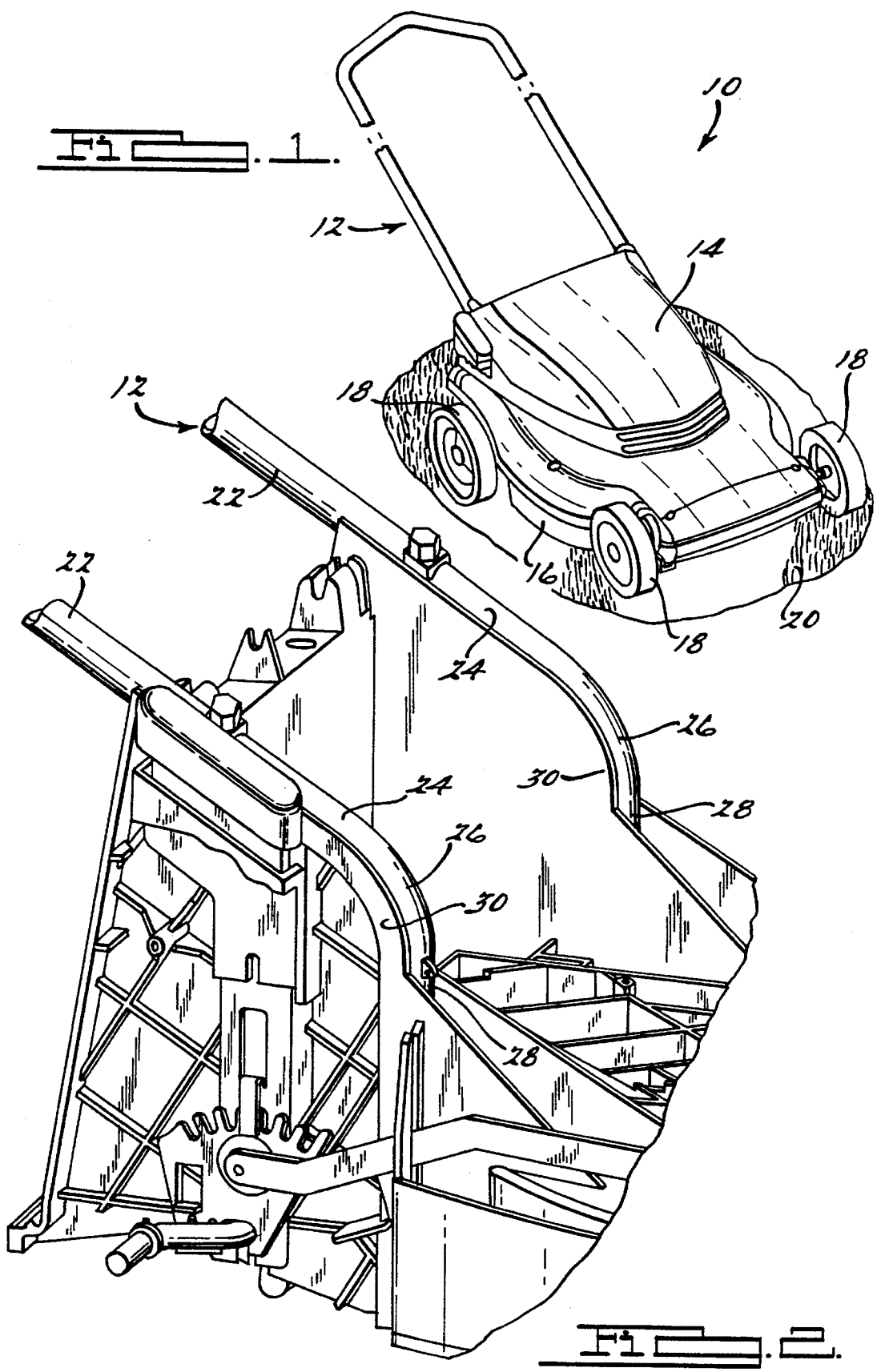

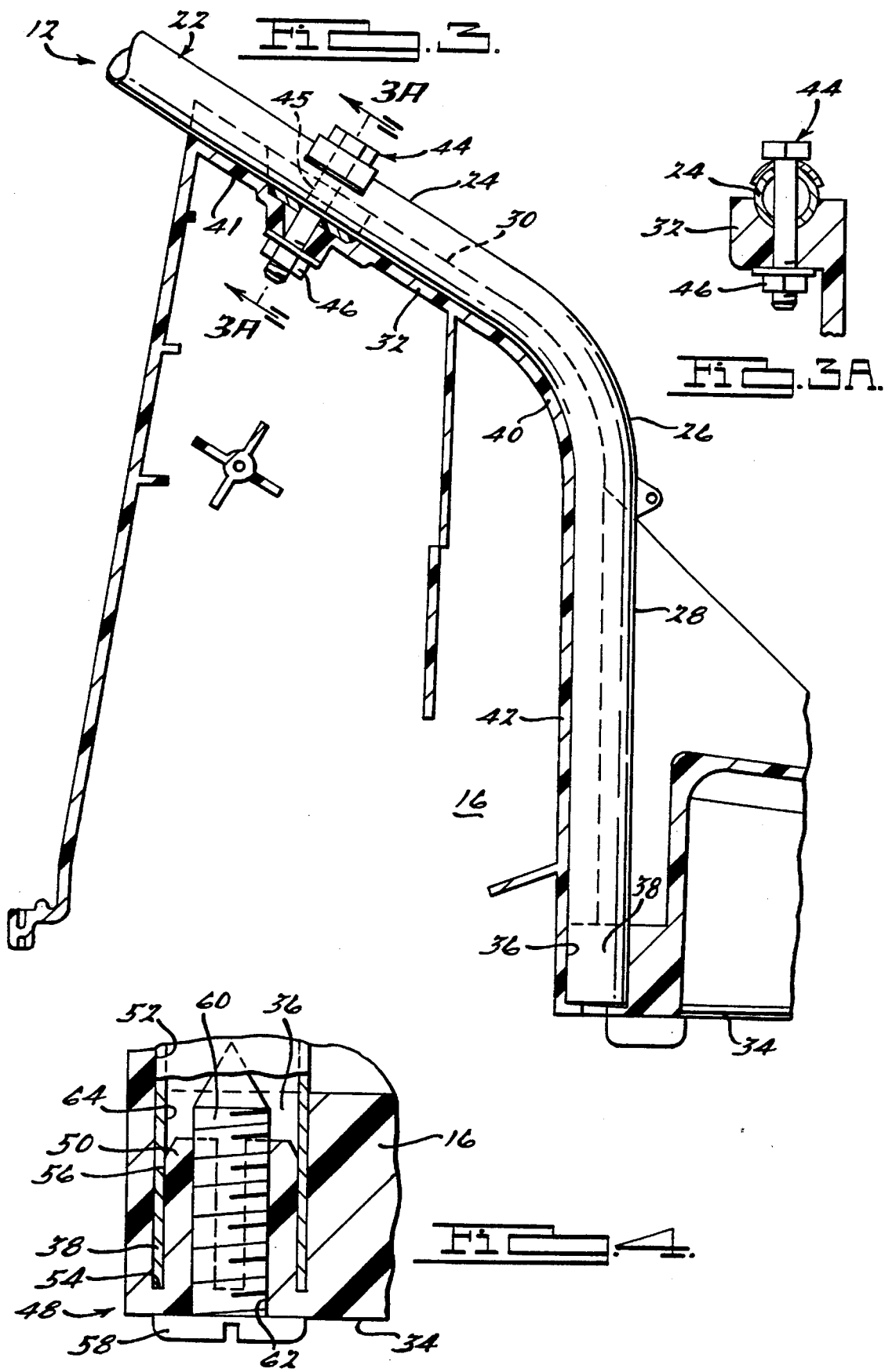

LAWN MOWER HAVING IMPROVED HANDLE-TO-DECK COUPLING ARRANGEMENT

CROSS-REFERENCE TO RELATED APPLICATIONS

The subject matter of the present application is related to U.S. Patent application Ser. No. 29/027,102, filed Aug. 12, 1994, and entitled "Design: Lawn Mower", assigned to the assignee of the present application;

U.S. Patent application Ser. No. 08/289,452, filed Aug. 12, 1994, and entitled "Lawn Mower Having Improved Deck Height Adjustment Mechanism", assigned to the assignee of the present application; and U.S. Patent application Ser. No. 08/383,755, filed Feb. 2, 1995, entitled "Mulching Lawnmower Having Volute Deck", assigned to the assignee of the present application.

BACKGROUND OF THE INVENTION

1. Technical Field

This invention relates to lawn mowers, and more particularly to an improved handle-to-deck coupling arrangement for securing a handle of a lawn mower to a deck of the mower in a manner which does not require the drilling of holes through the handle member, and which further spreads the forces experienced by the deck as the handle member is pushed down or lifted by the operator more evenly over a larger area of the deck, to thereby relieve stress on the deck during use.

2. Discussion

Vegetation cutters, such as lawn mowers, typically include some form of handle member which projects outwardly and upwardly from a deck portion of the mower for enabling an operator to push and steer the mower, as well as allowing the operator to lift a portion of the deck off the ground by pushing down on the handle member such as performed when making extremely sharp turns with the mower. The handle member typically extends outwardly from a rear portion of the deck by several feet, such that an individual walking behind the mower does not have to stoop or bend over while pushing and steering the mower.

Prior developed handle assemblies have typically involved securing the distal ends of the handle to a rear portion of the deck. The handle is usually formed from a single section of tubing, with each distal end secured to the deck usually by a pair of threaded fasteners. When the operator pushes down or lifts up on the handle member, the threaded fasteners, and a portion of the deck immediately adjacent the threaded fasteners, typically absorbs the full stress imparted by the distal ends of the handle member. Accordingly, the stress experienced by the deck is localized to a pair of very small areas. While this arrangement has proven satisfactory in some instances, in some situations, such as where the operator is required to push down or lift repeatedly with the handle during mowing, unacceptably high levels of stress can be imparted to the deck, thereby weakening portions thereof. Since deck assemblies are increasingly being manufactured from materials such as high strength plastic which, while providing generally excellent strength, is still not as strong as steel, the need for somehow alleviating or spreading out the stress experienced by the deck over a larger area has become an important consideration in the design of lawn mower handle systems.

From a manufacturing standpoint, most prior developed handle systems which incorporate a pair of threaded fasteners at each distal end of the handle member present the added drawback of increased manufacturing cost and complexity. This is because multiple holes require precision drilling or forming techniques, and add cost due to extra components and added assembly time. Accordingly, the overall cost of manufacture is increased at least slightly by the need to have precisely placed or located holes drilled or formed into the distal ends of the handle member.

The assignee of the present application, in U.S. Pat. No. 4,574,568, the disclosure of which is hereby incorporated by reference into the present application, has developed a collecting box for a garden tool in which a distal end of a tubular frame member is inserted within an opening in the body of the tool. While this arrangement has been found to be quite effective in spreading the stress experienced by the body of the tool over a greater surface area of the tool, it would nevertheless be highly desirable to improve even further upon the handle coupling arrangement disclosed in this patent. More specifically, it would be desirable to spread out the forces experienced by the deck over an even larger area and to provide the means for coupling the distal end of a handle member to the deck without requiring any holes or fasteners through the distal end.

In view of the above, it is an object of the present invention to provide an improved handle-to-deck coupling arrangement in which a tubular handle member of a lawn mower or other like vegetation cutter can be quickly, easily and conveniently coupled to a deck of the mower in a manner not requiring any threaded fasteners to be positioned to extend through the distal ends of the handle member. It is a further object to provide a coupling arrangement without using one or more threaded fasteners which extend through the distal ends of the handle member itself.

More specifically, it is an object of the present invention to provide a deck for a lawn mower and a handle member having a pair of distal ends, where the deck includes a pair of gradually curving channel portions adapted to receive the distal ends of the handle member, and wherein a pair of sockets are employed in the deck to receive the outer-most distal ends of the handle member therein.

It is a further object of the present invention to provide an anchor-type fastening assembly in communication with each of the channels which are adapted to matingly engage with the outermost distal ends of a handle member, and which can be clamped to the outer-most distal ends. Even more specifically, it is an object of the present invention to provide an improved handle-to-deck coupling arrangement which secures a tubular handle member to a deck of the mower in a manner which does not require any holes to be drilled or formed through the distal ends of the handle member.

SUMMARY OF THE INVENTION

The above and other objects are provided by a lawn mower having an improved handle-to-deck coupling arrangement. In the preferred embodiment of the invention, a handle member is provided which has a pair of distal end portions which are curved such that the outer-most ends of the distal portions extend downwardly into a portion of the deck of a lawn mower when the handle member is coupled to the deck of the mower. The deck includes a pair of channels which are adapted to receive the distal ends of the handle member. Each of the channels includes a curved portion and at least one generally linear portion for helping to spread the forces experienced by the deck when the handle member is pushed downwardly or lifted upwardly by an operator over a larger area of the deck.

In a preferred embodiment of the invention, a pair of anchor-type fastening assemblies are associated with the channels and positioned to receive, in mating engagement, an outer-most end of each of the distal ends of the handle member. The anchor-type fastening assemblies each include a threaded member which when threadably advanced from an unengaged position to an engaged position causes a plurality of latching members to lockably engage with an end-most portion of the distal portion of each handle member. In this manner, the distal ends of the handle member are secured within the deck. The coupling arrangement of the present invention further allows the distal ends of the handle member to be secured without the need for drilling or forming holes through the distal ends of the handle member itself and employing separate threaded fastening members positioned through the distal end portions.

Accordingly, the coupling arrangement of the present invention provides a significant manufacturing advantage in that the additional step of drilling holes through the handle member is obviated. The curvature of the channel portions provides the further benefit of spreading the forces imparted by the handle member on the deck over an even greater area of contact to further reduce the stresses experienced by the deck at any given point.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a lawn mower incorporating a handle-to-deck coupling arrangement in accordance with the present invention;

FIG. 2 is a perspective fragmentary view of a portion of the deck of FIG. 1 with the shroud removed showing how the distal ends of the handle member of the mower fit within channels formed into the deck and extend downwardly generally vertically at their outer-most distal ends;

FIG. 3 is a cross-sectional side view of a first embodiment of the present invention in which a single threaded fastener is used to secure each distal portion of the handle member to the deck;

FIG. 3a is a cross-sectional view of the handle member coupled to the deck in accordance with section line 3a—3a in FIG. 3; and FIG. 4 is a partial cross-sectional view of the deck and the socket used to receive the outer-most end of the distal portion of the handle member shown in FIG. 3, and also an anchor-type fastening assembly for interlocking with the outermost end to prevent the handle member from being accidentally withdrawn from the deck during use.

DETAILED DESCRIPTION OF THE PREFERRED EMBODIMENTS

Referring to FIG. 1, there is shown a vegetation cutter in the form of a lawn mower 10 which incorporates a handle-to-deck coupling arrangement in accordance with the present invention. While the following description will be presented in connection with the lawn mower 10, it will be appreciated that the principles of the present invention are equally applicable to a wide variety of vegetation cutters and other tools which are pushed or steered by an operator via a handle member.

With further reference to FIG. 1, the lawn mower 10 includes a single piece, integrally formed handle member 12, a shroud 14, a deck 16 and a plurality of wheels 18 for supporting the deck, and thus a cutting blade (not shown) housed within the deck 16, above a ground surface 20.

With reference to FIG. 2, the deck 16 is shown with the shroud 14 removed. The deck 16 is an integrally formed, single-piece structure formed from a suitably high strength plastic or other formable or castable material such as aluminum or steel. The handle member 12 includes a pair of distal portions 22. Each distal portion 22 includes a linear portion 24, a curved portion 26 and a lower-most, linear end portion 28. The distal portions 22 are adapted to rest within a pair of channels 30 formed in the deck (also shown in hidden lines in FIG. 3).

Referring now to FIG. 3, a bottom-most portion of the channel 30, designated by reference numeral 32, contacts substantially the entire length of the distal portion 22. A lower-most portion 34 of the deck 16 also includes a pair of integrally formed sockets 36 each formed so as to communicate with an associated one of the channels 30. The sockets 36 (only one being shown in FIG. 3) are identical to each other and have a size slightly larger than the outside dimension of the distal ends 22. In this manner, each socket 36 can receive an end-most distal portion 38 of the handle member therein to restrain the end-most portions 38 against lateral movement, as well as downward movement relative to the deck 16.

With further reference to FIG. 3, it can be seen that the bottom wall 32 of the channel 30 contacts the distal portion 22 along substantially its entire length. This allows upward or downward forces exerted on the handle member 12 by the operator to be spread out more evenly over a much larger area of the deck 16, to thereby reduce the stress and/or deflection experienced by the deck 16 at any given point. In particular, a curved portion 40, and an upper linear portion 41 of the channel 30, help to gradually spread out the stress experienced by the deck 16 when a downward pushing movement is exerted against the handle member 12. When an upward lifting movement is exerted on the handle member 12, a lower, generally linear portion 42 and curved portion 40 of the channel 30 help to spread out the stress experienced by the deck 16 over a relatively large area.

With continued reference to FIGS. 3 and 3a, when the socket arrangement 36 is employed, it is preferable to provide an aperture 45 in each distal portion 22 and a pair of fasteners 44 and nuts 46 (only one each being shown) for securing the distal portions 22 of the handle member 12 to the deck 16. Since the end-most portion 38 of the distal portion 22 is positioned within the socket 36, there is, however, no need to employ a pair of fasteners on each distal portion 22 of the handle member 12. Accordingly, a tangible cost savings can be realized by simplifying the manufacture of the handle member 12 by only requiring that a single hole be drilled or formed in each distal portion 22 of the handle member 12, and only requiring that a single fastener be used to secure the distal portion 22 in its associated channel 30. This is in contrast to many prior art handle-to-deck coupling arrangements in which a pair of fasteners must be employed in connection with a pair of holes drilled or formed in each distal portion of the handle member 12.

Referring now to FIG. 4, an anchor-type fastening assembly 48 is shown for use with the socket 36 shown in FIG. 3. The anchor-type fastening assembly 48 is integrally formed with the deck 16 and includes a plurality of arm portions 50 extending upwardly, circumferentially from the lower-most portion 34 of the deck 16. The arm portions 50 are spaced radially inwardly from an inner wall 52 of the socket 36 such that a circular channel 54 is formed between the inner wall 52 of the socket 36 and the outer portions 56 of the arm portions 50.

With continued reference to FIG. 4, a threaded fastener 58 is positioned such that a threaded portion 60 thereof extends into a generally circular opening 62 in the socket 36. Prior to the threaded fastener 58 being threadably engaged in the opening 62 (as shown in FIG. 4), the end-most portion 38 of the handle member 12 may be inserted into the socket 36 such that the arm portions 50 are received within an interior area of the end-most portion 38. When the threaded fastener 58 is advanced threadably into the opening 62, this causes the arm portions 50 to be urged radially outwardly into engagement with an inner wall 64 of the end-most portion 38. This lockably holds the end-most portion 38 within the socket 36. The anchor-type fastening assembly 48 provides the additional advantage that no other holes need be drilled or formed in the distal end portions 22 of the handle member 12 to lockably secure the distal end portions 22 to the deck 16. Accordingly, the manufacture of the mower is simplified together with a reduction in manufacturing costs. While only a single anchor-type fastening assembly 48 has been shown in FIG. 4, preferably two are provided, one each being associated with each channel 30. This improved coupling arrangement also reduces the stress on the fasteners as compared to typical coupling arrangements previously developed, and thus can save manufacturing costs by using smaller and lighter fasteners.

From the above, it will be appreciated that either of the embodiments of the present invention shown in FIGS. 3 and 4 provide a significant improvement over prior developed coupling arrangements. Both embodiments further simplify the manufacture of the mower 10 and reduce the cost of manufacture by requiring fewer component parts and fewer manufacturing operations to be performed with regard to the handle member 12 and deck 16 of the mower 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vegetation cutter having a handle member having a curved portion and a deck into which a portion of said handle member is secured, the improvement comprising:

a channel having at least one generally linear portion and a curved portion integrally formed in said deck;

a socket member formed integrally with the deck and communicating with said channel so as to receive a distal end of said handle member therein when said handle member is positioned within said channel; and an anchor-type fastening assembly associated with said socket and including a locking member which may be urged from a first position into a second position, the anchor-type fastening system operating to lockably engage a portion of an inner wall of said handle member when said locking member is urged from said first position into said second position, thereby retaining said distal end of said handle member to said deck.

2. The vegetation cutter of claim 1, wherein said anchor-type fastening assembly comprises:

a plurality of arm portions operably associated with said locking member such that when said locking member is advanced from said first position into said second position, said arm portions are urged radially outwardly by said locking member into abutting engagement with an inner surface of said distal end of said handle member.

3. The vegetation cutter of claim 1, wherein said anchor-type fastening assembly comprises:

a plurality of arm portions integrally formed with said socket member and adapted to fit within said distal end of said handle member when said locking member is in said first position;

said socket including an opening through which said fastener may be urged from said first position into said second position; and wherein urging said locking member through said opening into said second position causes said arm portions to be urged radially outwardly from a portion of said locking member into contact with an inner surface of said distal end of said handle member to thereby retain said distal end within said socket.

4. The vegetation cutter of claim 3, wherein when said locking member is in said first position, said arm portions are spaced apart from an inner wall of said socket to form a channel into which said distal end of said handle member may be inserted prior to urging said locking member from said first position into said second position.

5. A vegetation cutter having a handle member and a deck into which a portion of said handle member is secured, the improvement comprising:

a channel integrally formed in said deck;

a socket member formed integrally with said deck and communicating with said channel so as to receive a distal end of said handle member when said handle member is positioned within said channel;

an anchor-type fastening assembly integrally formed with said socket and including a plurality of flexible arm portions, an opening extending through a portion of said deck and within an area bounded by said flexible arm portions, and a fastening member adapted to be engaged within said opening; and said fastening member operating to urge said flexible arm portions radially outwardly of said opening when said fastening member is advanced from a first position into a second position such that said flexible arm portions abuttingly engage an inner surface of said distal end of said tubular handle member to thereby retain said tubular handle member to said deck.

6. The vegetation cutter of claim 5, wherein said fastening member comprises a threaded fastener adapted to be threadably advanced through said opening in said deck.

7. The vegetation cutter of claim 5, wherein when said fastening member is in said first position, said flexible arm portions are spaced apart from an inner wall of said socket member to form a channel between said inner wall of said socket member and an outer surface of each one of said plurality of flexible arm portions, said channel being adapted to receive said distal end of said tubular handle member therein prior to said fastening member being advanced from said first position to said second position.

8. The apparatus of claim 5, wherein said socket and said flexible arm portions are integrally formed with said deck.

9. The vegetation cutter of claim 5, further comprising a second fastener adapted to secure said distal end of said tubular handle member to said channel at a location spaced apart from said socket member.

10. A vegetation cutter having a handle member having a distal end, and a deck into which said distal end of said tubular handle member may be inserted and secured, the improvement comprising:

a channel for supporting said distal end;

a socket integrally formed in said deck and communicating with said channel such that when said distal end of said handle is positioned within said channel, a lowermost end portion of said distal end is positioned within said socket;

a plurality of flexible arm portions integrally formed within said socket and extending generally parallel with said lowermost end portion of said distal end of said tubular handle member;

said socket including an opening extending through a portion of said deck and positioned to fall within an area circumscribed by said flexible arm portions;

a threaded locking member positioned within said opening and threadably advanced from a first, non-locking position into a second, locked position, said threaded locking member operating to urge said flexible arm portions outwardly into contact with an interior wall of said lowermost end portion of said distal portion of said tubular handle member after said lowermost end portion is inserted within said socket, thus securing said handle member to said deck.

11. The vegetation cutter of claim 1 0, wherein said flexible arm portions are spaced apart from an inner surface of said socket when said threaded locking member is in said first position, thereby forming a channel between said inner surface of said socket and an outer surface of said flexible arm portions, said lowermost end portion of said distal end being insertable within said channel when said threaded locking member is in said first position.

12. The vegetation cutter of claim 11, further comprising a second threaded fastener adapted to extend transversely through a portion of said distal portion of said tubular handle member at a position spaced apart from said socket, to thereby further help secure said tubular handle member to said deck.

13. The vegetation cutter of claim 11, wherein said channel comprises an upper linear portion, a curved portion, and a lower linear portion, said handle member being shaped so as to rest against said upper linear, said curved and said lower linear portions of said channel when said lowermost end portion of said distal portion is inserted into said socket.

* * * * *